(12) United States Patent
Tan et al.

(10) Patent No.: US 7,495,583 B2
(45) Date of Patent: Feb. 24, 2009

(54) FLAT-TOP REFLECTION-BASED OPTICAL ENCODERS

(75) Inventors: Teong Swee Tan, Penang (MY); Premkumar S. Ramachandr, Perak (MY); Yee Loong Chin, Perak (MY); Cheng Why Tan, Penang (MY); Weng Fei Wong, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/404,110

(22) Filed: Apr. 14, 2006

(65) Prior Publication Data

US 2007/0241943 A1 Oct. 18, 2007

(51) Int. Cl.
*H03M 1/22* (2006.01)
(52) U.S. Cl. .................................. 341/13; 341/11
(58) Field of Classification Search .................. 341/13, 341/11; 235/454; 250/216
See application file for complete search history.

(56) References Cited

U.S. PATENT DOCUMENTS

| | | | |
|---|---|---|---|
| 5,448,358 A * | 9/1995 | Ishizuka et al. | 356/619 |
| 6,668,645 B1 * | 12/2003 | Gilmour et al. | 73/290 R |
| 2003/0193016 A1 | 10/2003 | Chin et al. | |
| 2006/0097051 A1 * | 5/2006 | Foo et al. | 235/454 |

\* cited by examiner

*Primary Examiner*—Rexford Barnie
*Assistant Examiner*—Joseph Lauture

(57) ABSTRACT

A reflection-based optical encoding apparatus for the detection of position and/or motion of a mechanical device includes an encoding medium having at least a first reflective portion, and an encoder housing having a light-emitting source and a light-detecting sensor embedded within, the encoder housing being placed in proximity to the encoding medium such that a functional light path can be established from the light-emitting source to the light-detecting sensor via the first reflective portion of the encoding medium. The encoder housing includes a first flat facet positioned between the light-emitting source and the encoding medium, the first flat facet having a first angle relative to a common geometric plane such that light passing from the light-emitting source to the encoding medium is refracted along a first angled path in a manner that the refracted light strikes a desired location of the encoding medium.

18 Claims, 6 Drawing Sheets

FLAT-TOP REFLECTION-BASED OPTICAL ENCODERS

BACKGROUND

The present disclosure relates to an optical encoding device for the sensing of position and/or motion.

Optical encoders are used in a wide variety of contexts to determine position and/or movement of an object with respect to some reference. Optical encoding is often used in mechanical systems as an inexpensive and reliable way to measure and track motion among moving components. For instance, machines such as printers, scanners, photocopiers, fax machines, plotters, and other imaging systems often use optical encoders to track the movement of an image media, such as paper, as an image is printed on the media or an image is scanned from the media.

Generally, an optical encoder includes some form of light emitter/detector pair working in tandem with a "codewheel" or a "codestrip". Codewheels are generally circular and can be used for detecting rotational motion, such as the motion of a paper feeder drum in a printer or a copy machine. In contrast, codestrips generally take a linear form and can be used for detecting linear motion, such as the position and velocity of a print head of the printer. Such codewheels and codestrips generally incorporate a regular pattern of slots and bars depending on the form of optical encoder.

While optical encoders have proved to be a reliable technology, there still exists substantial industry pressure to simplify manufacturing operations, reduce the number of manufacturing processes, minimize the number of parts and minimize the operational space. Accordingly, new technology related to optical encoders is desirable.

SUMMARY

In a first sense, a reflection-based optical encoding apparatus for the detection of position and/or motion of a mechanical device includes an encoding medium having at least a first reflective portion, and an encoder housing having a light-emitting source and a light-detecting sensor embedded within, the encoder housing being placed in proximity to the encoding medium such that a functional light path can be established from the light-emitting source to the light-detecting sensor via the first reflective portion of the encoding medium. The encoder housing includes a first flat facet positioned between the light-emitting source and the encoding medium, the first flat facet having a first angle relative to a common geometric plane such that light passing from the light-emitting source to the encoding medium is refracted along a first angled path in a manner that the refracted light strikes a desired location of the encoding medium.

In a second sense, a reflection-based optical encoding apparatus for the detection of position and/or motion of a mechanical device includes an encoding medium having at least a first reflective portion, and an encoder housing having a light-emitting source and a light-detecting sensor embedded within, the encoder housing being placed in proximity to the encoding medium such that a functional light path can be established from the light-emitting source to the light-detecting sensor via the first reflective portion of the encoding medium. The encoder housing includes a first flat facet positioned between the light-detecting sensor and the encoding medium, the first flat facet having an angle such that light passing from a desired location of the encoding medium is refracted along an angled path in a manner that the refracted light is directed to the light-detecting sensor.

In a third sense, a reflection-based optical encoding apparatus for the detection of position and/or motion of a mechanical device includes an encoding medium having at least a first reflective portion, an encoder housing having a light-emitting source and a light-detecting sensor embedded within, the encoder housing being placed in proximity to the encoding medium such that a functional light path can be established from the light-emitting source to the light-detecting sensor via the first reflective portion of the encoding medium and a first refractive means positioned between the encoder body and the encoding medium for advantageously refracting light along an angled path in a manner to establish the functional light path.

DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

Optical encoders are generally classified into two categories: transmission-based optical encoders and reflection-based optical encoders.

Figure 1:
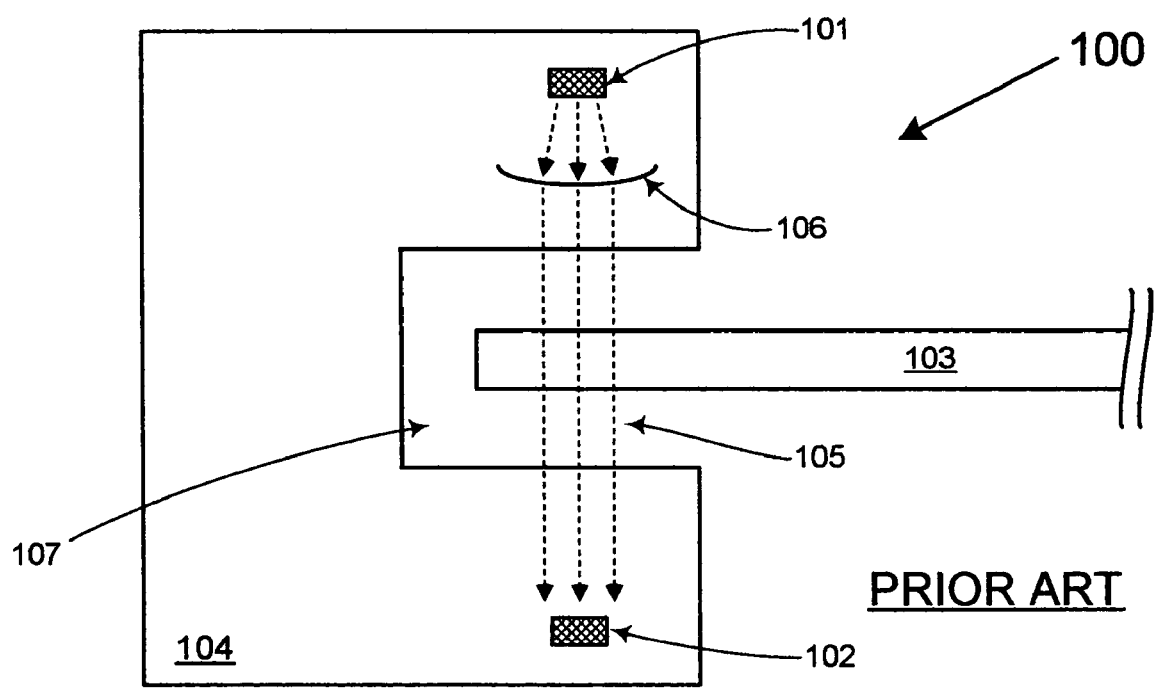
FIG. 1 shows a 1 transmission-based optical encoder.

FIG. 1 shows a transmission-based optical encoder 100. As shown in FIG. 1, the encoder 100 includes an optical emitter 101 and an optical detector 102 encased in a housing 104. An optical lens 106 can be incorporated into the housing 104 below the optical emitter 101 to collimate light emitted by the optical emitter 101 into parallel light 105. A free area 107 is provided between the optical emitter 101 and the optical detector 102 and a codewheel/codestrip 103 is free to rotate or move inside the free area 107.

In operation, light emitted by the optical emitter 101 can be collimated by the optical lens 106, then transmitted through the free area 107 and the codewheel/codestrip 103. Should the codewheel/codestrip 103 be positioned such that a slot/opening is present along the path of the transmitted light, such light can continue to the optical detector 102 where it can be detected. Should the codewheel/codestrip 103 be positioned such that a no slot/opening is present along the path of the transmitted light, the transmitted light will be blocked and the optical detector 102 can detect the absence of light.

Figure 2:
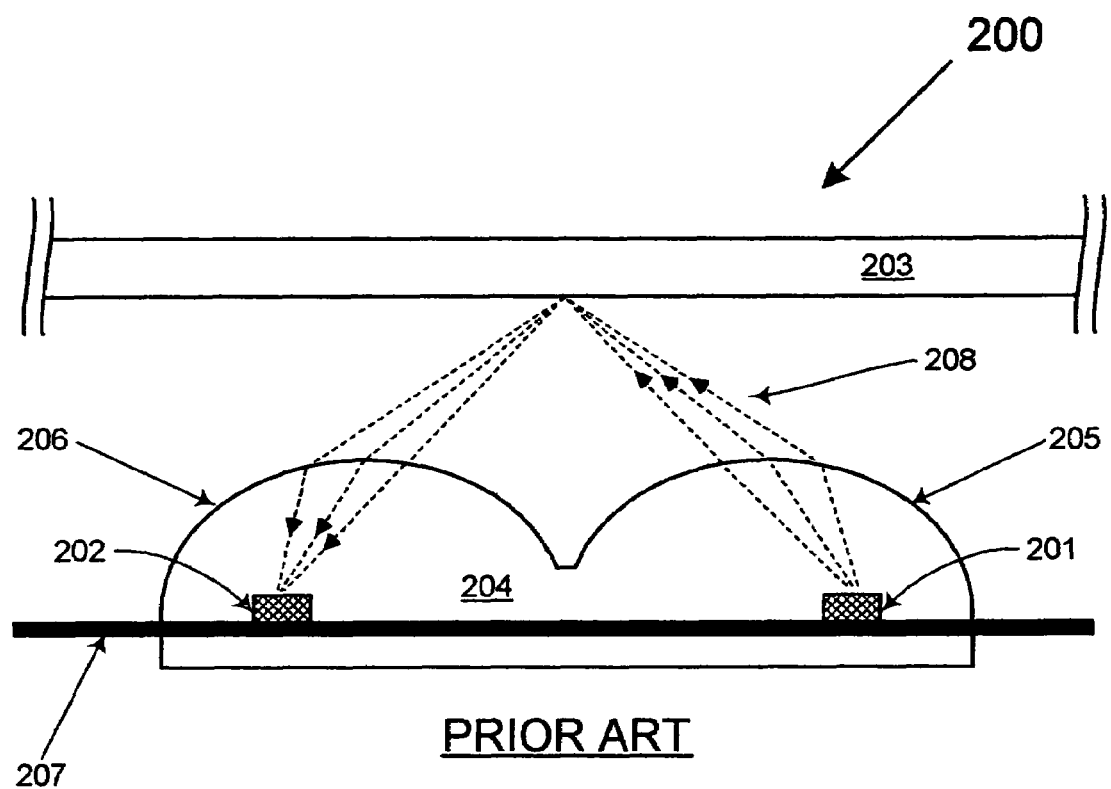
FIG. 2 shows a reflection-based optical encoder.

In contrast to the transmission-based device of FIG. 1, a reflection-based optical encoder 200 is shown in FIG. 2. The reflection-based encoder 200 includes an optical emitter 201 and an optical detector 202 mounted on a leadframe 207 and encapsulated in an optical housing 204, which is typically made from some form of resin or glass. The exemplary optical element 204 has two dome-shaped surfaces, with the first dome-shaped surface 205 directly above the optical emitter 201 and the second dome-shaped surface 206 directly above the optical detector 202.

In operation, light emitted by the optical emitter 201 can be focused or collimated by the first dome-shaped surface 205 (which can act as a lens), then transmitted to the codewheel/codestrip 203. Should the codewheel/codestrip 203 be positioned such that a reflective slot/bar is present along the path of the transmitted light, the transmitted light will be reflected to the second dome-shaped surface 206 (which also can act as a lens) and focused onto the optical detector 202 where it can be detected. Should the codewheel/codestrip 203 be positioned such that a no reflective slot/bar is present along the path of the transmitted light, the transmitted light will be effective blocked, and the optical detector 202 can detect the absence of light.

Figure 3:
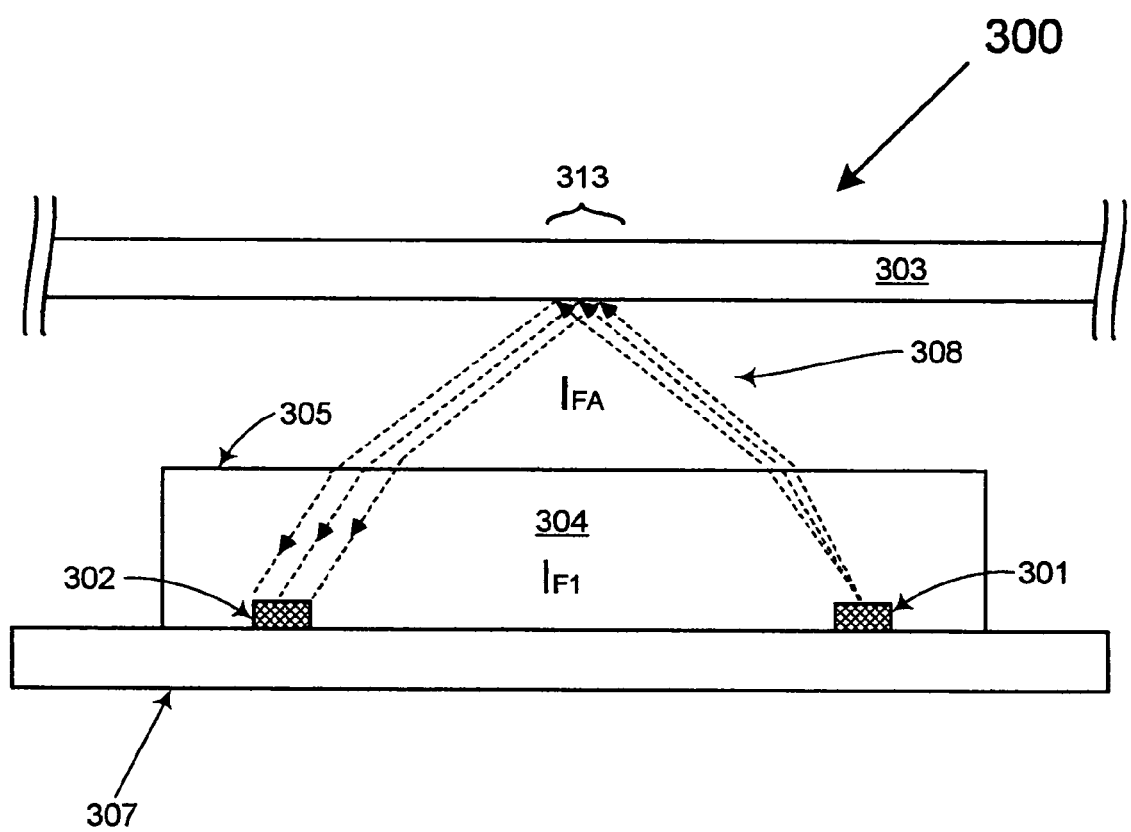
FIG. 3 shows a novel flat-top reflection-based optical encoder.

FIG. 3 shows a novel flat-top reflection-based optical encoder 300. As shown in FIG. 3, the optical encoder 300 includes an optical emitter 301 and an optical detector 302 both mounted on substrate 307 and encapsulated in an optical housing 304. The housing 304 has a single flat surface/facet 305 positioned over both the emitter 301 and detector 302 with the facet 305 being parallel relative to the substrate 307. A codewheel/codestrip 303 is positioned above the facet 305 at an appropriate distance.

In operation, light emitted by the optical emitter 301 can be refracted as it passes the facet 305, where the light can be further transmitted to the codewheel/codestrip 303 along the various light paths 308 shown in FIG. 3. Should the codewheel/codestrip 303 be positioned such that a reflective strip/slot/bar is present along the light paths 308, the transmitted light can be intercepted at location 313, reflected back to the encoder housing 304, refracted a second time as it passes the boundary of the facet 305 and then directed to the optical detector 302 where it can be sensed/detected. Should the codewheel/codestrip 303 be positioned such that a no reflective strip/slot/bar is present along the light path 308 and at location 313, the transmitted light can be effectively blocked and the optical detector 302 can detect the absence of light. Further, should the codewheel/codestrip 303 be configured such that a combination of reflective and non-reflective bars are simultaneously present along the light path 308 and at location 313; the codewheel/codestrip 203 can reflect light commensurate with the pattern of reflective and non-reflective bars such that the pattern is effectively projected onto the optical detector 301.

As mentioned above, as light passes between the optical housing 304 and the air, the light will be refracted at the air/housing boundary, i.e., facet 305. This refraction can be a function of the refractive index $I_{F1}$ of the material of the housing 304, the refractive index $I_{FA}$ of air, and the angle at which the light intercepts the facet 305. Accordingly, it should be appreciated that the design choice of material for housing 304 as well as the relative positions of the emitter 301 and detector 302 (as well as various other special distances and geometries) can impact the desired performance of the optical encoder 300 as a whole. As such, it should be appreciated that the various design choices for materials and geometries/spacing can vary from embodiment to embodiment as may be found desirable or useful.

An advantage to the approach of flat-topped optical detectors is that they eliminate the need for external domes, which constrain package height and can make an encoder unnecessarily sensitive to mechanical alignment. By incorporating a flat-topped encoder package, package height can be reduced, alignment issues can be relaxed and manufacturing can be simplified. While flat-topped optics generally may not achieve the theoretical resolution of a domed lens, optical encoders using flat-topped bodies can nonetheless be used for codestrips/codewheels having more than 75 lines-per-inch, which satisfies a great deal of industry needs.

Figure 4:
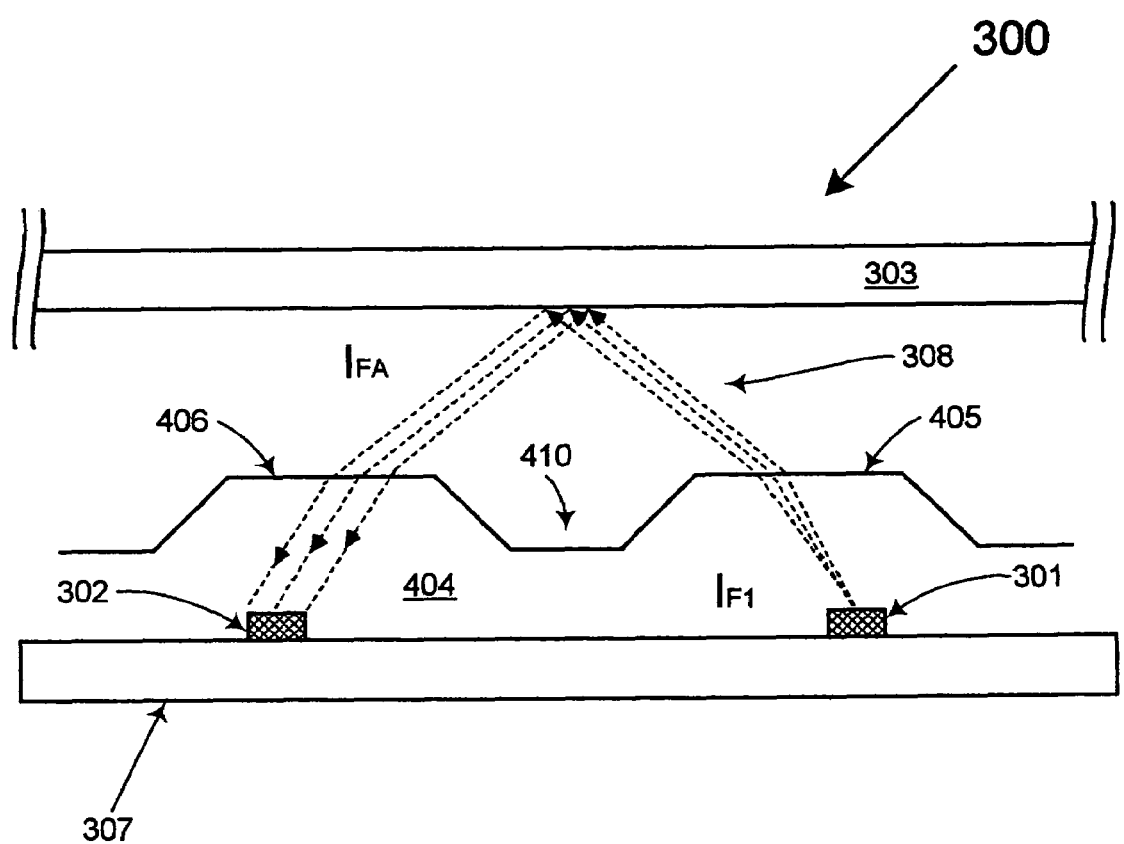
FIG. 4 shows a first variant of the novel reflection-based optical encoder of FIG. 3.

FIG. 4 shows a first variant of the novel reflection-based optical encoder of FIG. 3. As is depicted in FIG. 4, the variant optical encoder 400 is similar in structure to the encoder 300 of FIG. 3, but has a different body structure. That is, encoder housing 404 incorporates a trench 410, which effectively forms two separate facets 405 and 406 through which light can pass. The trench 410 is an isolating structure that serves to improve isolation between the emitter 301 and detector 302 such that light is less likely to propagate from the emitter 301 to the detector 302 without being reflected via the codewheel/codestrip 303.

While the detectors 202/302 and emitters 201/301 of the flat-topped encoders 200/300 depicted in FIGS. 3 and 4 are shown mounted on a common substrate, it should be appreciated that in various embodiments detectors and emitters may be mounted on different substrates as may be required or advantageous in various situations, and that the facets for the detectors and emitters may or may not run along the same plane or along parallel planes.

Figure 5:
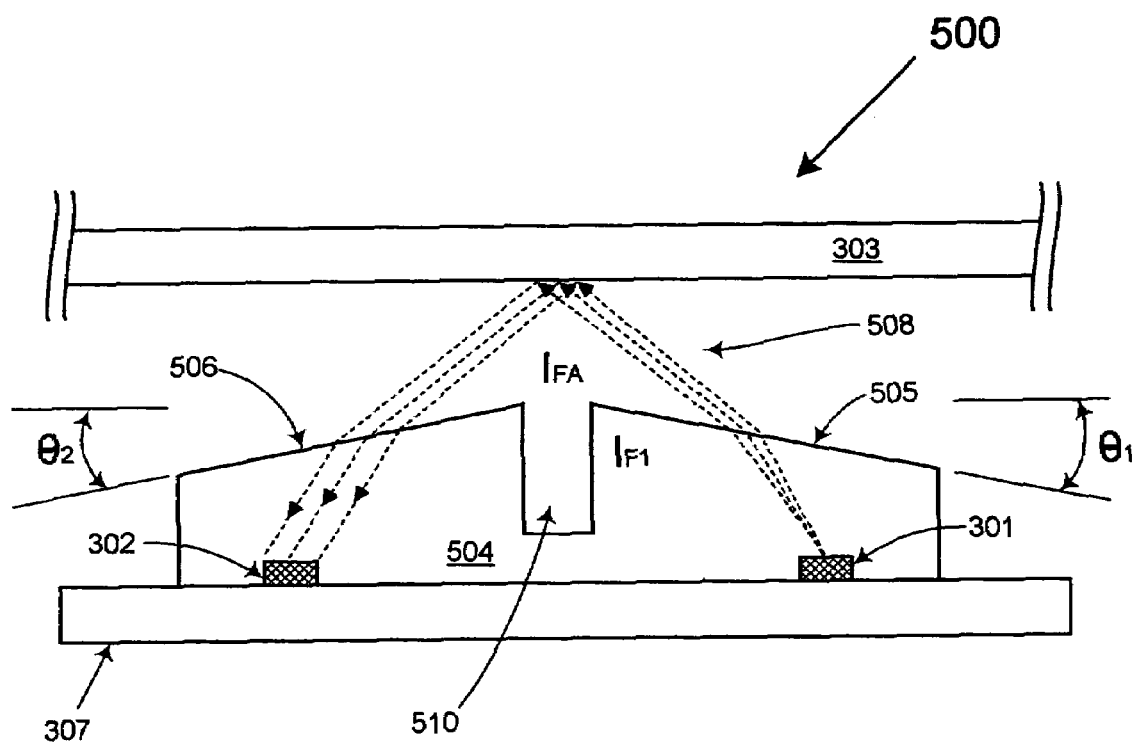
FIG. 5 shows a second variant of the novel reflection-based optical encoder of FIG. 3.

FIG. 5 shows yet another variant of the novel reflection-based optical encoder of FIG. 3. As is depicted in FIG. 5, the variant optical encoder 500 includes an optical emitter 301 and an optical detector 302 both mounted on substrate 307 and encapsulated in housing 504. The housing 504 has two flat facets 505 and 506 positioned over the emitter 301 and detector 302, respectively, with the facets 305 and 306 each having a respective angle $\theta_1/\theta_2$ relative to the substrate 307. An optical isolation trench 510 is provided between the optical emitter 301 and the optical detector 302, and a codewheel/codestrip 303 is positioned above the facets 305 and 306 at an appropriate distance.

The operation of the encoder 500 of FIG. 5 is essentially the same as with the previous examples. However, as light passes through the facets 505 and 506, such light can be refracted as a function of angles $\theta_1$ and $\theta_2$ as well as the various refractive indexes $I_{F1}/I_{FA}$ and the relative spatial distances and geometries of the emitter 301, the detector 302 and other components. While it is envisioned that $\theta_1$ and $\theta_2$ will be equal in many embodiments, other encoder embodiments can take the form of asymmetric optical arrangements having different $\theta_1$ and $\theta_2$ angles, and still other encoder embodiments can take the form of one angle being zero degrees with the other angle being a non-zero degree angle.

Analysis indicated that the use of angled facets may improve the resolution of an optical encoder as compare to the optical encoders depicted in FIGS. 3 and 4. However, whether or not an angled facet is the best design choice for a particular optical encoder can depend on a variety of other design considerations.

Figure 6:
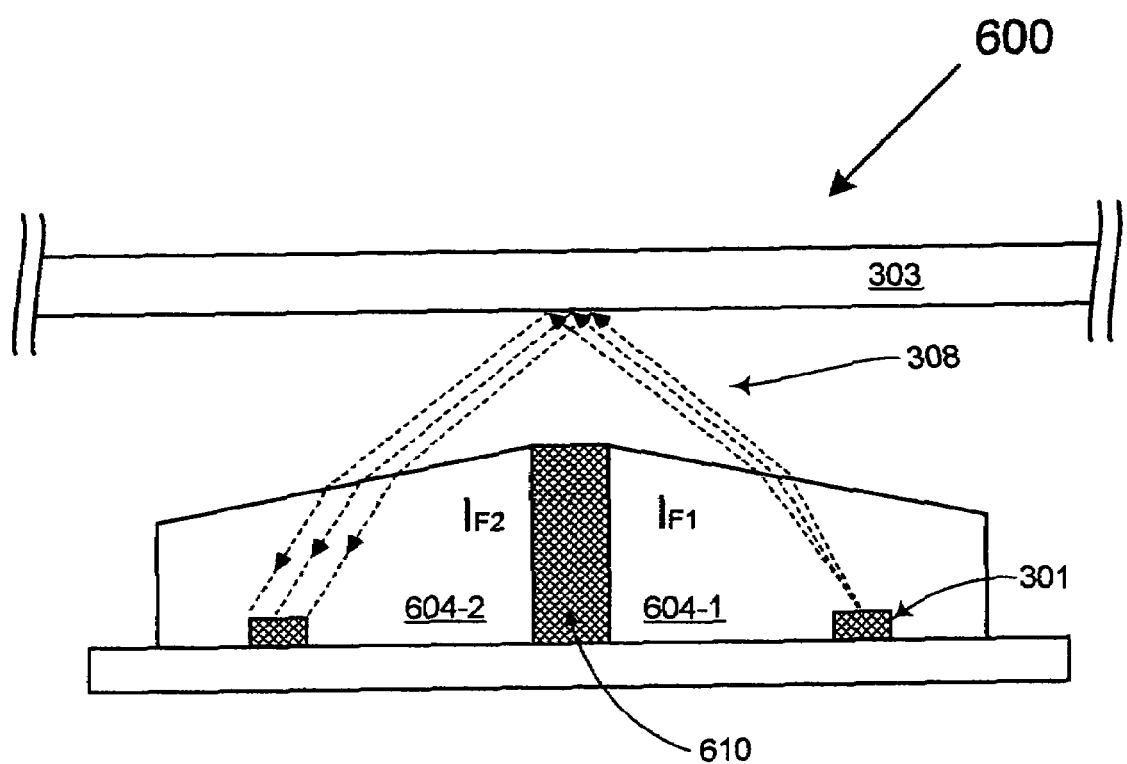
FIG. 6 shows a variant of the novel reflection-based optical encoder of FIG. 5.

FIG. 6 shows a variant of the optical encoder of FIG. 5. As is depicted in FIG. 6, the variant optical encoder 600 has a number of separate and independent differences. The first difference is that the trench 510 of FIG. 5 can be replaced with an optional opaque structure 610 to further improve isolation. The second difference is that the encoder 600 has a bifurcated body with an emitter side 604-1 and a detector side 604-2. The separate encoder body sides 604-1 and 604-2 optionally can be made of different materials having different refractive indexes $I_{F1}/I_{F2}$, and as mentioned above with respect to FIG. 5, $\theta_1$ and $\theta_2$ can vary relative to one another with the understanding that other design criteria, such as the positioning of the emitter 301 and/or detector 302 may vary accordingly.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:

1. A reflection-based optical encoding apparatus for the detection of position and/or motion of a mechanical device, the apparatus comprising:
   an encoding medium comprising at least a first reflective portion; and
   an encoder housing comprising a light-emitting source and a light-detecting sensor embedded within, the encoder housing being placed in proximity to the encoding medium such that a functional light path can be established from the light-emitting source to the light-detecting sensor via the first reflective portion of the encoding medium; the the encoder housing further comprising:
   a first flat facet positioned between the light-emitting source and the encoding medium, the first flat facet having a first angle relative to a common geometric plane such that light passing from the light-emitting source to the encoding medium is refracted along a first angled path toward a desired location of the encoding medium, wherein the first flat facet does not comprise a diffraction grating.

2. The optical encoding apparatus of claim 1, wherein the encoder housing further includes a second flat facet, the second flat facet being positioned between the light-detecting sensor and the encoding medium, the second flat facet having a second angle relative to the common geometric plane such that light passing from the desired location of the encoding medium is refracted along a second angled toward the light-detecting sensor.

3. The optical encoding apparatus of claim 2, wherein the encoder housing has an optical isolation structure located between the light-emitting source and the light-detecting sensor.

4. The optical encoding apparatus of claim 3, wherein the encoder housing has a unitary structure.

5. The optical encoding apparatus of claim 4, wherein the light-emitting source and the light-detecting sensor are mounted on a common substrate.

6. The optical encoding apparatus of claim 2, wherein the first angle of the first facet relative to the common geometric plane and the second angle of the second facet relative to the common geometric plane are substantially the same.

7. The optical encoding apparatus of claim 6, wherein both the first facet and second facet are essentially parallel to the common geometric plane.

8. The optical encoding apparatus of claim 6, wherein both the first facet and second facet are substantially not parallel to the common geometric plane.

9. The optical encoding apparatus of claim 2, wherein the first angle of the first facet relative to the common geometric plane and the second angle of the second facet relative to the common geometric plane are substantially not the same.

10. The optical encoding apparatus of claim 9, wherein at least one of the first facet and second facet is not parallel to the common geometric plane.

11. The optical encoding apparatus of claim 9, wherein both the first facet and second facets are not parallel to the common geometric plane.

12. The optical encoding apparatus of claim 1, wherein the encoding medium is at least one of a codewheel and a codestrip.

13. An optical encoding apparatus for the detection of position and/or motion of a mechanical device, the apparatus comprising:
    an encoding medium comprising at least a first reflective portion; and
    an encoder housing comprising a light-emitting source and a light-detecting sensor embedded within, the encoder housing being placed in proximity to the encoding medium such that a functional light path can be established from the light-emitting source to the light-detecting sensor via the first reflective portion of the encoding medium, the encoder housing further comprising:
    a first flat facet positioned between the light-detecting sensor and the encoding medium, the first flat facet having an angle such that light passing from a desired location of the encoding medium is refracted along an angled path toward the light-detecting sensor, wherein the first flat facet does not comprise a diffraction grating.

14. An optical encoding apparatus for the detection of position and/or motion of a mechanical device, the apparatus comprising:
    an encoding medium having at least a first reflective portion;
    an encoder housing having a light-emitting source and a light-detecting sensor embedded within, the encoder housing being placed in proximity to the encoding medium such that a functional light path can be established from the light-emitting source to the light-detecting sensor via the first reflective portion of the encoding medium; and
    a first refractive means comprising a flat facet positioned between the encoder body and the encoding medium for refracting light along an angled path in a manner to establish the functional light path, wherein the first flat facet does not comprise a diffraction grating.

15. The optical encoding apparatus of claim 14, wherein the first refractive means is positioned between the light-emitting source and the encoding medium.

16. The optical encoding apparatus of claim 15, further comprising a second refractive means positioned between the encoder body and the encoding medium for advantageously refracting light along an angled path in a manner to establish the functional light path.

17. The optical encoding apparatus of claim 16, wherein the first refractive means is positioned between the light-detecting sensor and the encoding medium.

18. The optical encoding apparatus of claim 14, further comprising an isolation means positioned between the light-detecting sensor and the light-emitting source.

* * * * *

UNITED STATES PATENT AND TRADEMARK OFFICE
CERTIFICATE OF CORRECTION

| | | |
|---|---|---|
| PATENT NO. | : 7,495,583 B2 | Page 1 of 1 |
| APPLICATION NO. | : 11/404110 | |
| DATED | : February 24, 2009 | |
| INVENTOR(S) | : Yee Loong Chin et al. | |

It is certified that error appears in the above-identified patent and that said Letters Patent is hereby corrected as shown below:

Column 5, Line 29, Claim 1, delete "the the" and insert --the--.

Signed and Sealed this

Twenty-first Day of December, 2010

David J. Kappos
*Director of the United States Patent and Trademark Office*